United States Patent [19]

Hayes et al.

[11] Patent Number: 5,024,013
[45] Date of Patent: Jun. 18, 1991

[54] IDENTIFICATION TAG ASSEMBLY

[75] Inventors: Norman J. Hayes, Cody, Wyo.;
Raymond B. Avedon, Boulder, Colo.

[73] Assignee: Identification Technology Corporation, Longmont, Colo.

[21] Appl. No.: 277,886

[22] Filed: Nov. 30, 1988

[51] Int. Cl.⁵ ............................................. G09F 3/00
[52] U.S. Cl. ................................................... 40/301
[58] Field of Search ................. 40/301, 302, 300, 299, 40/1.5, 1.6, 637, 639, 640; 119/156; 63/12, 13

[56] References Cited

U.S. PATENT DOCUMENTS

| 335,100 | 2/1886 | Adams et al, | 63/12 |
| 3,595,201 | 7/1971 | Dumas | 40/301 |
| 3,952,439 | 4/1976 | Armand | 40/301 |
| 3,979,847 | 9/1976 | Schwindt et al. | 40/301 |
| 4,718,374 | 1/1988 | Hayes | 40/301 |

FOREIGN PATENT DOCUMENTS

| 0166485 | 1/1986 | European Pat. Off. | 40/301 |
| 858267 | 11/1940 | France | 40/301 |
| 759383 | 10/1956 | United Kingdom | 63/12 |

Primary Examiner—Kenneth J. Dorner
Assistant Examiner—J. Hakomaki
Attorney, Agent, or Firm—Klaas & Law

[57] ABSTRACT

An identification tag assembly comprising a one-piece molded plastic identification member with a plurality of radially extending circumferentially spaced flexible foldable identification indicia receiving means and a flexible connecting strap portion having an enlarged connecting head portion with a curved pointed tip portion and an elongated cutting blade slot; and a one-piece molded connecting member having a slot for receiving the connecting head portion.

22 Claims, 7 Drawing Sheets

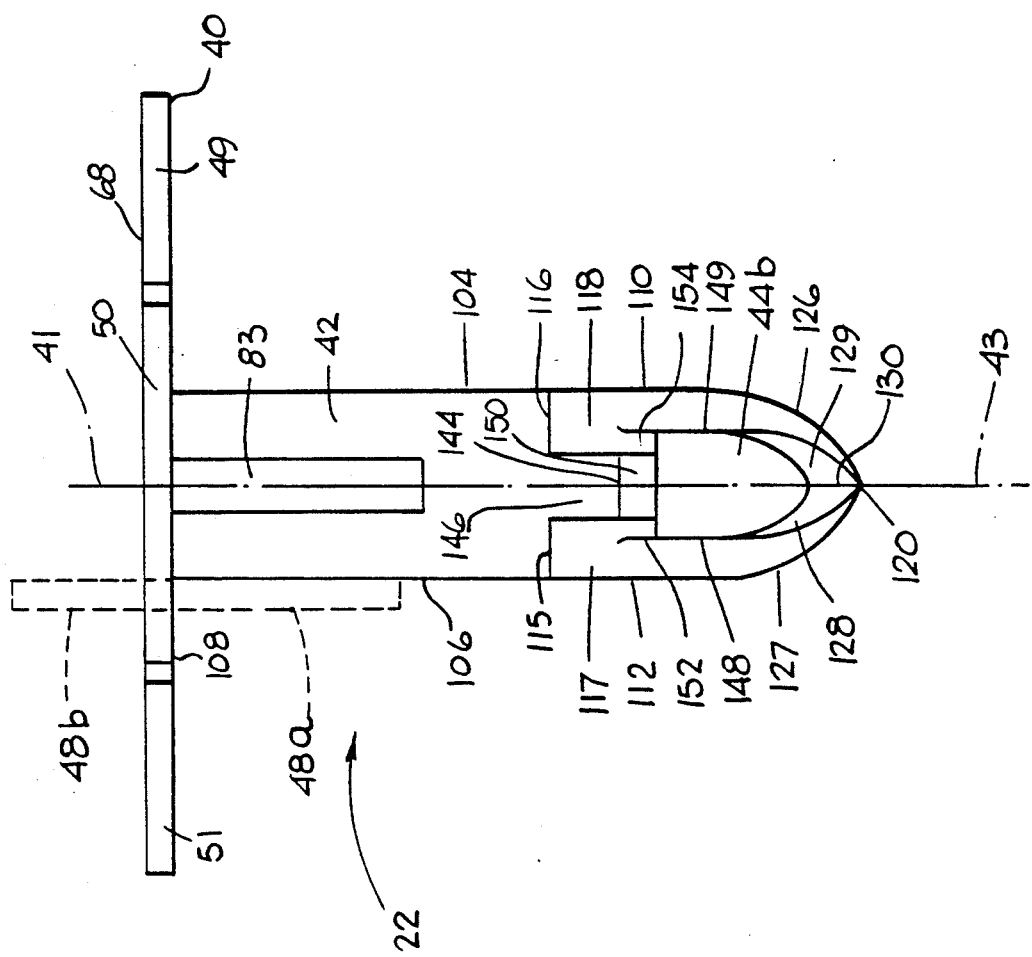
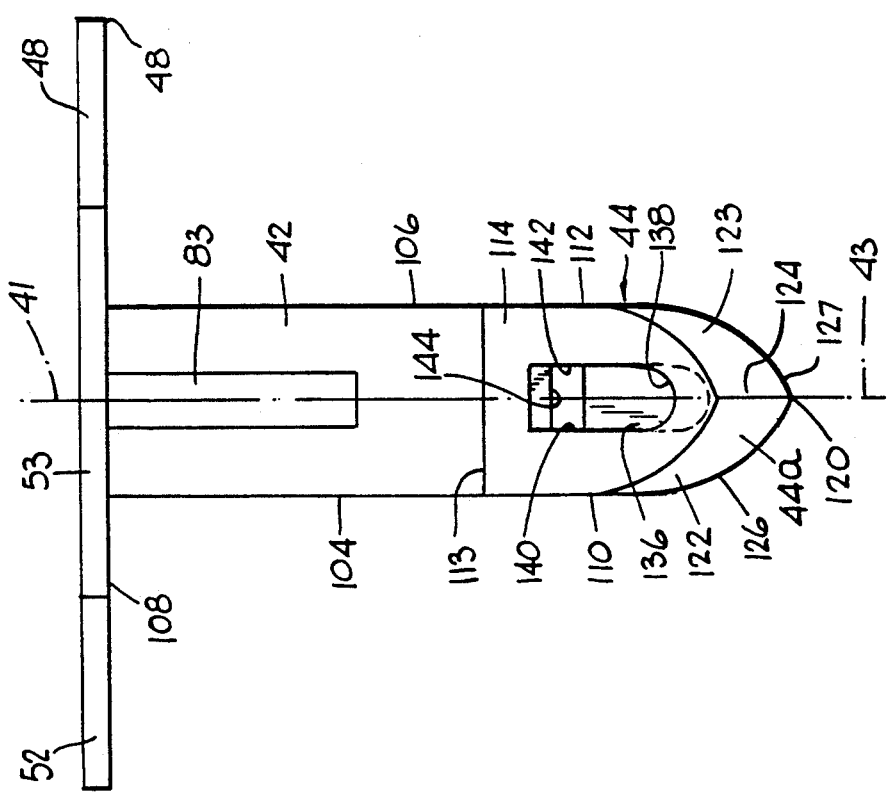
FIG. 5
FIG. 4

IDENTIFICATION TAG ASSEMBLY

BACKGROUND AND SUMMARY OF INVENTION

This invention relates to animal identification tags, and more particularly, to a two-piece ear tag assembly for hogs comprising a main identification tag member and a tag attachment member and which may include an electronic identification signal generating means.

Various problems and prior art solutions related to animal identification tags and tag applicators are discussed in prior U.S. Pat. Nos. 3,260,007; 3,896,577; 3,958,353; 4,102,073; 4,121,591; 4,147,168; 4,516,577; 4,552,147; 4,612,877; 4,718,374 and 4,738,258, the disclosures of which are incorporated herein by reference.

In general, the present invention relates to two piece tag assemblies wherein there is an identification member and an attachment member which are made of molded plastic material. The tag assembly of the present invention is particularly adapted to be mounted in the rear side central portion of the rear side part of the ear of the hog (swine) animal species. The present invention comprises a tag assembly of relatively small size which is constructed and arranged not only to be easily mounted in a preferred location, but which is also constructed and arranged to prevent damage in use, and employs a flexible connecting means rather than a rigid connection means.

The present invention involves the use of an one piece identification member having a flat identification portion with a transversely extending intermediate flexible connecting strap portion which terminates in a connecting head portion. A tag attachment member is mounted in the animal ear pocket to receive the head portion. The identification portion faces rearwardly to be at the rear of the animal ear while also being protected from engagement with foreign objects such as fence wires and posts, stall frames, trees and branches, ropes, etc. because of its location immediately to the rear of the animal ear. The identification portion is segmented to provide a plurality of resilient flexible sections to resist damage including damage resulting from chewing by other hogs. In addition, the construction and arrangement of the identification member facilitates the use of an electronic identification signal sending means mounted on the identification member. For example, a low range electronic identification device may be mounted on the identification member and be in proper operational position as the animal places its head into a feeding or watering bowl or trough having an electronic identification signal receiving means for receiving identification signals from the electronic identification signal sending means. The use of a relatively thin flexible generally flat connecting strap means portion on the identification member reduces strain on the animal ear and less likelihood of loss of the identification member in use.

Another feature of the present invention is the provision of an one piece tag attachment member which is constructed and arranged to be located inside the animal ear with a central slot adapted to enable a portion of the flat connecting strap means to extend therethrough and resilient flexible retaining means in juxtaposition to the central slot for retainingly engaging a head portion on the end of the strap means. Other advantages and features of the invention are described hereinafter. While the ear tag assembly and system of the present invention has particular utility for use with hogs, it is contemplated that the invention may be used for other kinds of domestic and non-domestic animals.

BRIEF DESCRIPTION OF DRAWINGS

Illustrative and preferred embodiments of the invention are shown by the accompanying drawings in which:

FIG. 4 is a top view of the identification member;

FIG. 5 is a bottom view of the identification member;

DETAILED DESCRIPTION

Figure 1:
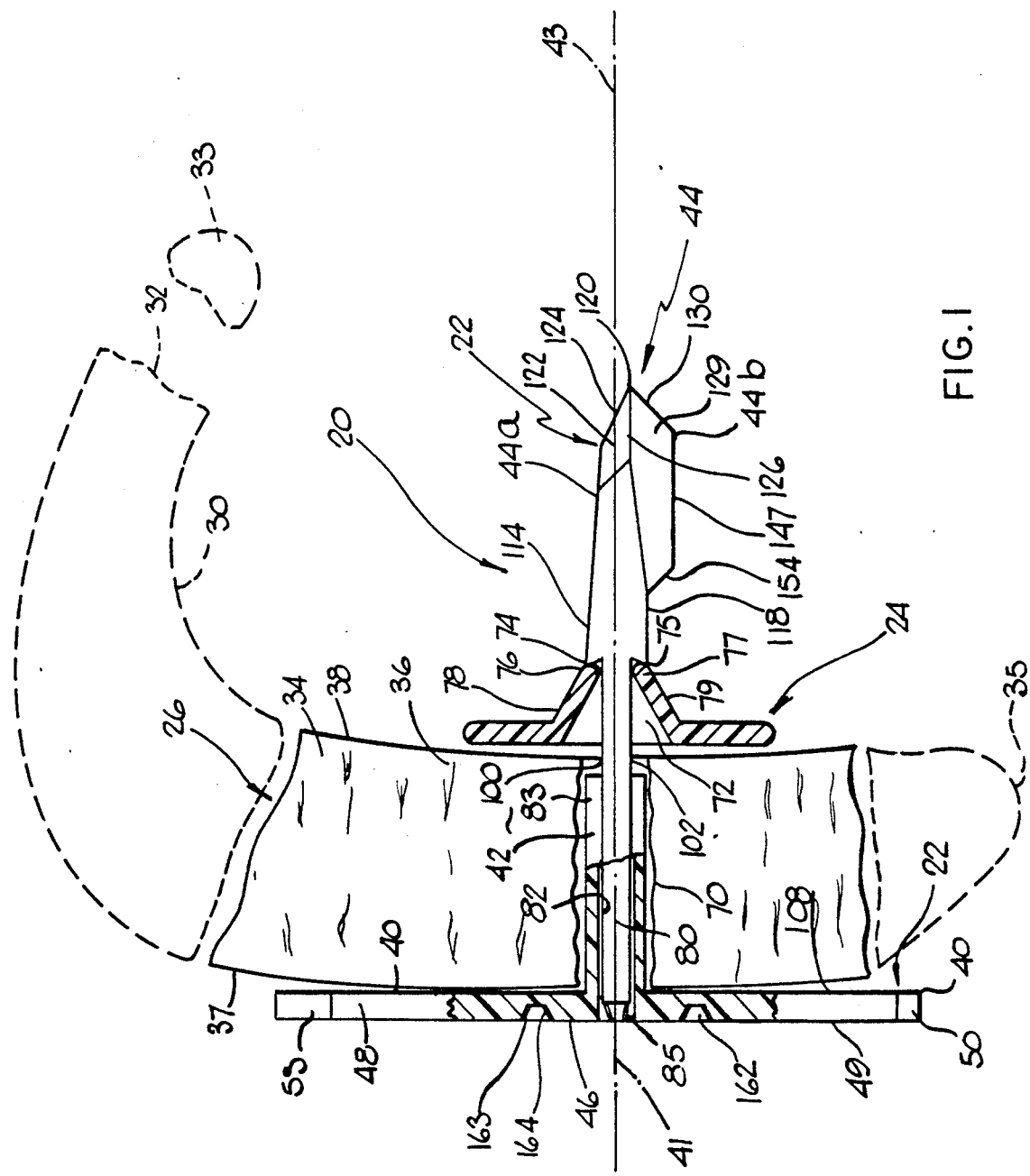
FIG. 1 is a side elevational view, partly in cross-section, of an ear tag assembly of the present invention mounted in an animal ear.
Figure 2:
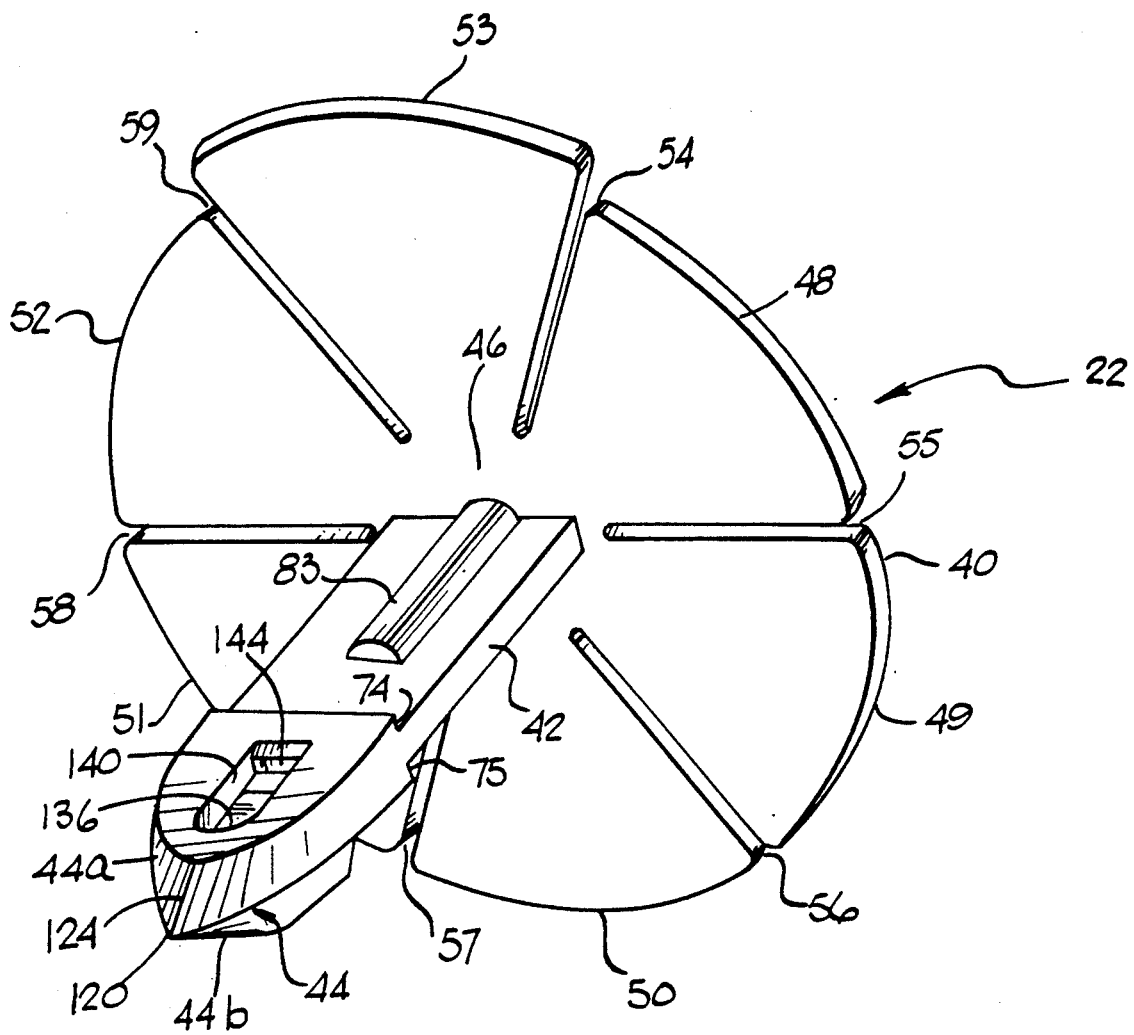
FIG. 2 is a perspective view of the identification member of the assembly of FIG. 1.

In general, the two piece ear tag assembly 20 of the present invention comprises an identification member 22 made of one piece of resilient molded plastic material, such as polyurethane, and an attachment member 24 made of one piece of relatively rigid, but also resilient molded plastic material such as Nylon which are adapted to be mounted on the ear 26 of a swine-type (e.g., hog) animal as shown in FIG. 1.

The terms "vertical", "upper", "lower", "upwardly", "downwardly", "forwardly", "rearwardly", "inner", "outer" and related terms used in this specification and the appended claims refer to the normal position of the tag assembly when mounted in a generally horizontal attitude on the ear of an animal as shown in FIG. 1. However, the tag assembly may be mounted in various other attitudes on various other portions of the body of various other kinds of animals, birds and wildlife.

While the inventive concepts are applicable to various kinds of animals, the present tag assembly is particularly adapted to use with animals of swine species and, in particular, mass produced domestic hogs raised for slaughter at commercial meat packing plants. As generally illustrated in FIG. 1, the ear of swine-type animals comprises a generally horizontally extending upper portion 30 which interconnects a relatively short vertically downwardly extending front lobe portion 32 terminating in a lower anterior border 33 and a relatively long vertically downwardly extending rear lobe portion 34 terminating in a posterior border 35. There is an area 36 of the animal ear in the rear lobe portion which is particularly well suited for mounting of the animal tag assembly of the present invention. The area 36 is located between a first lowermost cartilage rib portion and a next upwardly adjacent cartilage rib portion. The area 36 provides a relatively flat, generally vertically extending, rearwardly facing outer surface 37 and a relatively flat generally vertically extending forwardly facing inner surface 38 along an inner pocket area.

Figure 3:
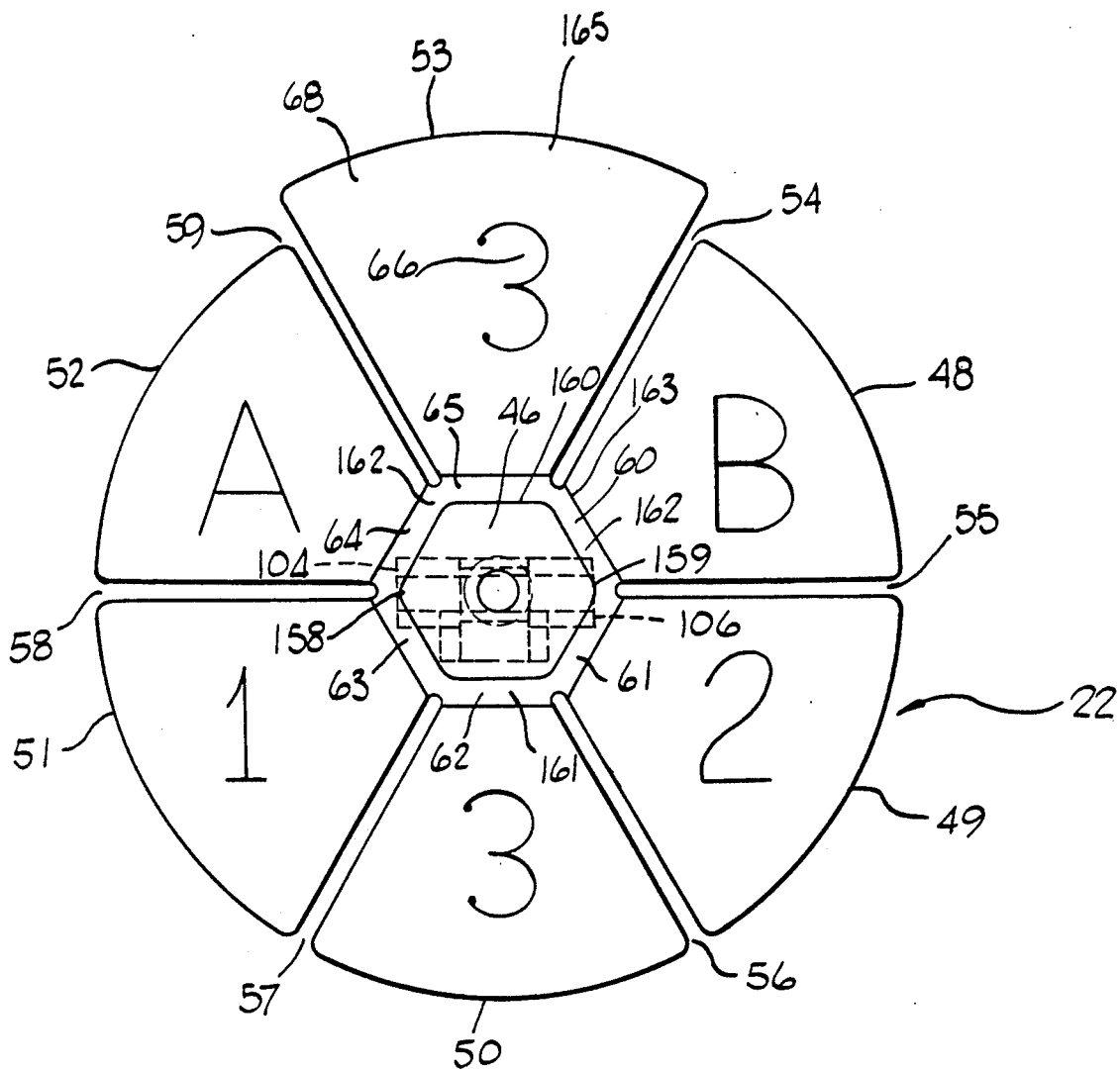
FIG. 3 is a rear end view of the identification member.

In general, the identification member 22 comprises a flat relatively thin (e.g., 0.06 inch) enlarged generally vertically extending identification portion 40 having a generally annular peripheral configuration with a central axis 41, a narrow width generally horizontally extending flexible strap portion 42 having a central longitudinal axis 43 which is coaxial with central axis 41, and an enlarged connecting head portion 44 which is connectably associated with attachment member 24. The identification portion 40 has a central core portion 46 and a plurality of resilient flexible segmental portions 48-53 separated by radially extending slots 54-59 and resiliently flexibly pivotally connected to the core portion 46 by hinge means 60-65 (FIG. 3). The segmental portions are adapted to bear suitable alpha/numeric visual identifying indicia 66 applied to rearwardly facing coplanar marking surfaces 68 in any suitable manner such as by ink images or hot stamping or by slots cut through the identification portion. Strap portion 42 extends forwardly through a horizontal cut slit 70, FIG. 1, in the animal ear and through a central horizontal passage 72 in attachment member 24. Head portion 44 is located forwardly of attachment member 24 with rearwardly facing flat inclined abutment surface means 74, 75 engaging forwardly facing rounded surface abutment means 76, 77, on flexible rib portions 78, 79 of attachment member 24. A conventional active or passive electronic signal sending means 80 may be suitably mounted on or attached to the identification member 22. In the presently preferred embodiment, means 80 has a cylindrical configuration and is mounted in a central cylindrical slot 82 in an enlarged cylindrical portion 83 on the connecting strap portion 42 for sending a coded electronic identification signal to a conventional electronic signal receiver means (not shown) as described in U.S. Pat. Nos. 4,512,877 and 4,718,374.

The signal sending means 80 may be placed in slot 82 after molding of the identification tag member 40 through opening 85 or the identification tag member may be integrally molded therearound. Signal sending means 80 may be heat sealed or adhesively fixed in the slot or removably and replaceably mounted therein.

Figure 6:
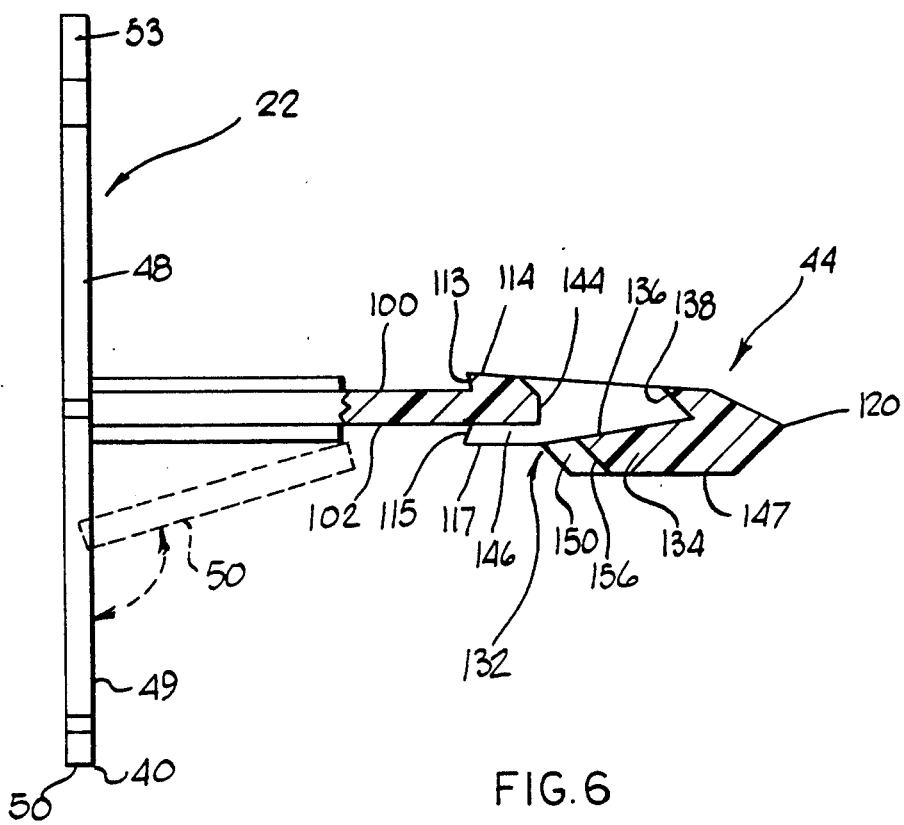
FIG. 6 is a cross-sectional side elevational view of the identification member in association with an applicator blade of an applicator tool.

Connecting strap portion 42 preferably has approximately the same or slightly larger thickness, e.g., approximately 0.072 inch, as identification portion 40 as measured between opposite upper and lower flat side surfaces 100, 102, FIG. 6, a width of approximately 0.40 inch as measured between opposite parallel side edge surfaces 104, 106, FIG. 4, and a length of approximately 0.80 inch as measured from identification portion side surface 108 to head portion abutment surface means 74, 75.

Head portion 44 has opposite side edge surfaces 110, 112, which are coplanar with strap side edge surfaces 104, 106. Abutment means 74 is provided by an inclined side surface 113, FIGS. 4 and 6, extending between a flat upper head surface 114 and strap side surface 100. Abutment means 75 is provided by a pair of spaced inclined coplanar side surfaces 115, 116, FIGS. 5 and 6, extending between spaced flat lower head surfaces 117, 118 and strap side surface 102.

In general, head portion 44 comprises an uppermost relatively large-size main portion 44a and a lowermost relatively small-size lug portion 44b for mounting in a blade mounting slot in an applicator blade as hereinafter described. Uppermost head portion 44a and lowermost head portion 44b converge in a forwardmost pointed tip portion 120. Head portion 44a has upwardly rearwardly inclined upper curved surfaces 122, 123, FIGS. 1 and 4, which intersect along a rearwardly upwardly inclined straight edge surface 124 and inwardly curved side edge surfaces 126, 127. Lug portion 44b has downwardly rearwardly inclined lower curved surfaces 128, 129, FIGS. 1 and 5, which intersect along a downwardly rearwardly inclined lead edge surface 130.

A cutting blade slot means 132, FIG. 6, is provided in head portion 44 for receiving a correspondingly shaped portion of a cutting blade of a conventional applicator tool for mounting of the tag assembly as hereinafter described. A suitable applicator tool is shown and described in EPO application, Ser. No. 0138570, the disclosure of which is incorporated herein by reference. Slot means 132 comprises a bottom wall portion 134 having a flat inclined upper surface 136, a rearwardly inclined upper transverse curved front surface 138, flat side wall surfaces 140, 142, FIG. 4, and an inclined rear flat surface 144, and a slot 146 between abutment surface portions 115, 116. Bottom wall portion 134 has a flat bottom outer surface 147 and parallel outer side surfaces 148, 149 which merge with curved surfaces 128, 129. A slot 150 is defined by inclined side wall portions 152, 154 and a rearwardly facing inclined surface 156. An important feature is the location of the rear end of slot 132 substantially forwardly of the abutment means 74, 75 within the portion of the head of maximum thickness. The construction and arrangement is such as to provide rearwardly facing opening means for enabling insertion and withdrawal of the cutting blade while also providing rearwardly facing abutment means for engagement with the cutting blade during mounting of the ear tag assembly.

As shown in FIG. 3, core portion 46 has a hexagonal peripheral configuration and a maximum width of approximately 0.40 inch, as measured between connecting portions 158, 159 which are coplanar with strap side surfaces, and a width of approximately 0.36 inch as measured between opposite side surfaces 160, 161. Hinge means 60-65 are formed by slots 162 having inclined side walls 163, 164, FIG. 1. Slots 162 have a depth of approximately one-half (e.g., 0.03 inch) the thickness of the segmental portions 48-53 and a maximum width of approximately 0.044 inch. Radial slots 54-59 intersect and extend into hinge slots 162 opposite core side connecting portions 158, 159. The construction and arrangement is such that each of the segmental portions 48-53 can be resiliently pivotally displaced at least 90° both forwardly and rearwardly as illustrated by dotted lines 48a, 48b in FIG. 5. In addition, segmental portion 53 has a greater radial length and is of larger size than the other segmental portions so as to provide a locator means in the form of an upwardly protruding ear portion 165. Upper locator segment portion 53 and opposite lower segment portion 50 are located in alignment with upper and lower strap surfaces 100, 102 with associated hinge means 62, 65 extending parallel to surfaces 100, 102. Thus, locator ear portion 53 extends vertically upwardly when the strap portion 42 extends horizontally.

In the presently preferred embodiment, the identification portion has a thickness of approximately 0.060 inch; small radius segmental portions 48-52 have a radius of approximately 13/16 inch; and large radius segmental portion 53 has a radius of approximately 15/16 inch. The width of core portion 46 is approximately 3/8 inch. Strap portion 42 has a thickness of approximately 0.072 inch, a length of approximately 0.79 inch and a width of approximately −0.40 inch. Head portion 44 has a length of approximately 0.66 inch, a maximum width of 0.40 inch and a maximum thickness of approximately 0.2078 inch as measured between surfaces 113 and 147. Portion 134 has a width of approximately 0.22 inch as measured between side surfaces 148, 149.

In use, the flexible resilient small size segmental identification portions resist gripping action between the teeth of other hogs who may attempt to chew on the identification portion. At least four segmental portions should be provided and the use of six segmental portions is particularly advantageous.

Figures 7, 9:
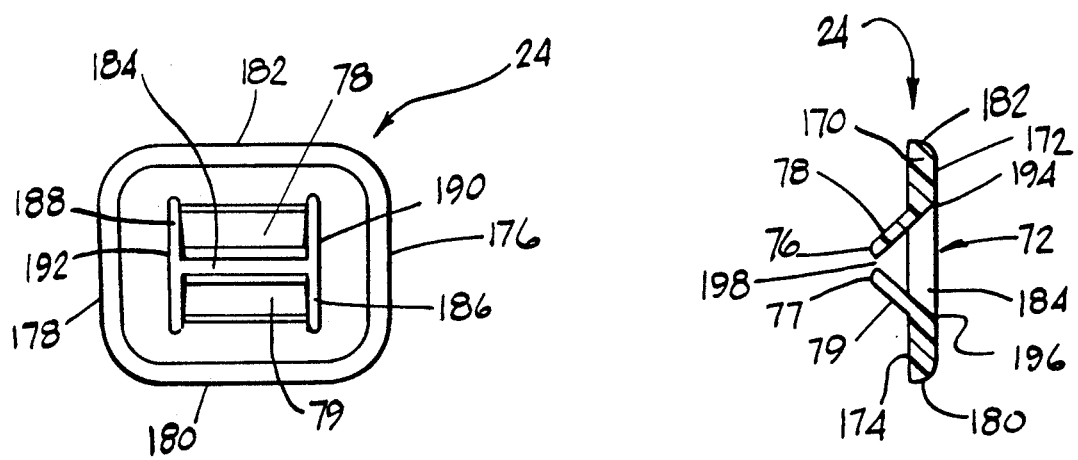
FIG. 7 is a front side view of the retaining member of the assembly of FIG. 1.
FIG. 9 a cross-sectional side elevational view of the retaining member.
Figure 8:
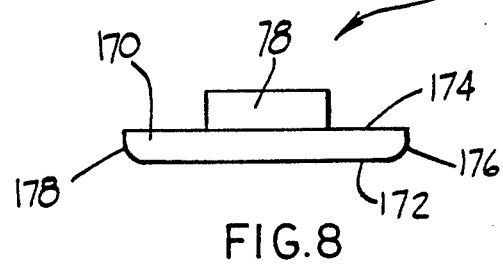
FIG. 8 is a side elevational view of the retaining member.

As shown in FIGS. 7-9, retaining member 24 comprises a general flat base portion 170 having an oval peripheral configuration defined by opposite parallel flat front and rear side surfaces 172, 174, opposite parallel side edge surfaces 176, 178 and opposite parallel side edge surfaces 180, 182. Rear side surface 172 is engageable with the front side surface of the animal ear. Central slot means 72 has an I-shape peripheral configuration defined by a central slot portion 184 and opposite transverse end slot portions 186, 188. The length of slot portion 184, as measured between side surfaces 190, 192 is slightly larger than the width of head portion 44 as measured between side surfaces 110, 112 to enable the head portion 44 to freely pass therethrough. The width of slot portion 184, as measured between end surfaces 194, 196, FIG. 9, is substantially larger than the maximum width of head portion 44 as measured between head surfaces 114, 147 to allow passage of the head portion and cutting blade member. Resilient rib portions 78, 79 are inwardly inclined toward one another with tapered oppositely spaced side surfaces terminating in rounded end surfaces 76, 77, normally defining an opening 198 having a width less than the thickness of head portion 44 between surfaces 114, 117, 118. Thus, head portion 44 may be forced through the slot by resilient outward deflection of rib portions 78, 79 which then resiliently inwardly deflect to engage abutment means 74, 75 whereby the head portion 44 may not be withdrawn through the slot after assembly on the animal ear. However, the construction and arrangement is such as to permit limited relative movement between the retaining member and the head portion and the strap portion in various directions to avoid breakage and irritation.

Figure 10:
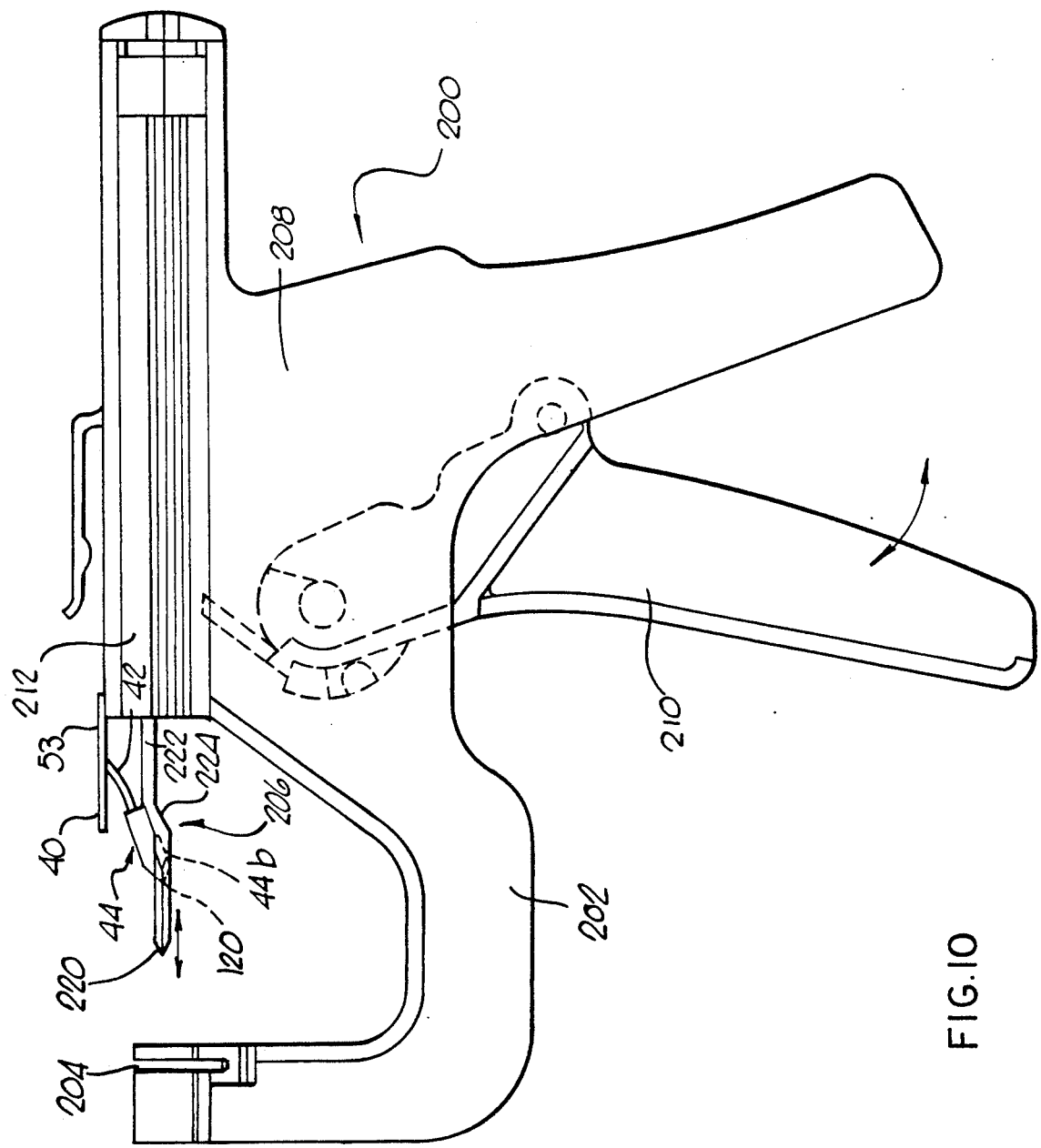
FIG. 10 is a side elevational view of an applicator tool for application of the tag assembly of the present invention.

In assembly and mounting of the identification member 22 and the attachment member 24, a suitable applicator tool may be utilized with the identification member being mounted on one jaw in association with a reciprocable cutting knife blade for cutting the ear slit and the attachment member being mounted on the other jaw. As shown in FIG. 10, a conventional applicator tool 200 comprises a U-shape jaw portion 202 having a retainer member mounting slot 204 opposite a movable blade member 206 mounted in an operating mechanism housing 208 and being operable by movable handle member 210. In operation, the retainer member 22 is placed in slot 204. The head portion 44 of identification member 20 is mounted in an opening in blade member 206 with identification portion 40 supported on applicator barrel 212 by enlarged locator segment 53 and strap portion 42 curved upwardly therebetween.

Figure 12:
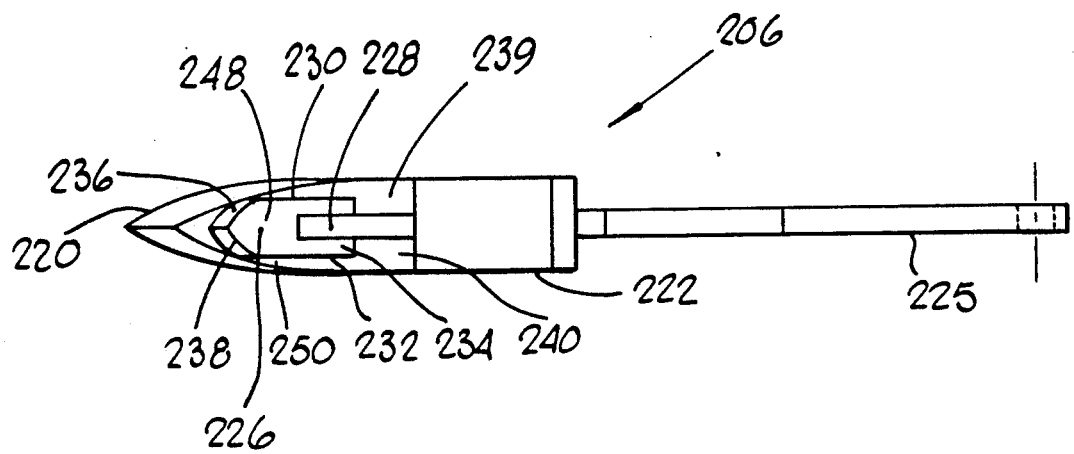
Figure 11:
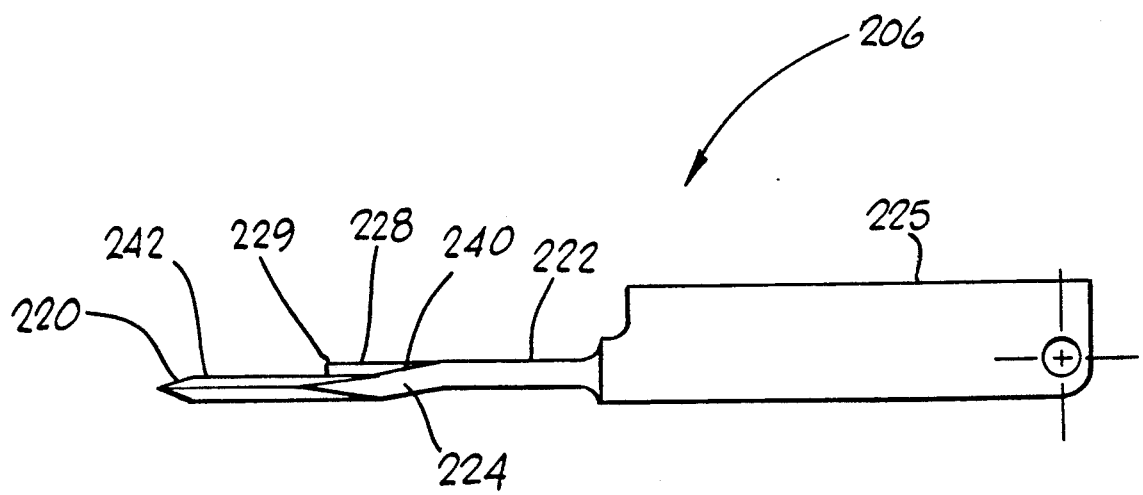
FIG. 11 is a side elevational view of an applicator blade for use with the applicator tool of FIG. 10.

As shown in FIGS. 11 and 12, in general, blade member 206 has a cutting tip front end portion 220 which is laterally offset from a central intermediate shank portion 222 and connected thereto by an inclined connecting portion 224. Rear end shank portion 225 is slidably mounted in applicator tool barrel 212. A head lug mounting slot 226 is provided in cutting tip portion 220 and a holding tang portion 228 extends forwardly from shank portion 222 above the rear portion of mounting slot 226. Mounting slot 226 has a size and shape generally corresponding to the blade mounting lug portion 44a of the head portion of the identification tag. Holding tang portion 228 has a size and shape such as to be frictionally slidably insertable into slot means 132 in head portion 44. As the blade is forcibly driven forwardly, a slit is cut in the animal ear and the head portion 44 is carried through the slit and the slot 72 in the retaining member 24. When the blade is retracted, the head portion 44 is released from the blade and the blade is retracted through the retainer member slot and the ear slit. In the preferred embodiment, the blade is pivotally mounted relative to the tool drive mechanism so as to facilitate release and removal relative to the animal ear.

The construction and arrangement of the head portion 44 of the identification member 22 and the cutting blade member 206 is generally applicable to other types of identification tags and applicator tools. For example, the construction and arrangement disclosed herein is preferable to that disclosed in prior U.S. Pat. No. 4,612,877 and provides substantially improved results.

The cutting blade member 206 has a rectangular cross-sectional configuration and cutting tip portion 220 is laterally offset relative to the central shank portion 222 and connected thereto by an inclined connecting portion. The elongated tag mounting slot 226 is centrally located in and extends through the cutting end portion between the tip portion and the connection portion. The mounting slot has spaced parallel side wall surfaces 230, 232, a transverse flat rear side wall surface 234 and forwardly, upwardly inclined transverse intersecting curved front wall surfaces 236, 238. Tang portion 228 is mounted on the inclined connecting portion 224 and extends forwardly toward and has a forward end portion 229 located above the rear end portion of the mounting slot 226.

The mounting slot 226 has a size and shape which generally corresponds to the size and shape of the mounting lug portion 44b of the tag head 44, except that the length of the mounting slot is substantially longer than the length of the mounting lug portion to enable relative longitudinal sliding movement therebetween during mounting of the tag on the blade and release of the tag from the blade after assembly on the animal ear. The tag head 44 is mounted on the blade by placing the mounting lug 44b in the front end of the mounting slot 226 with curved lug side surfaces 128, 129 engaging curved slot side surfaces 236, 238 and with the front tang end portion 229 located rearwardly adjacent and aligned with the opening 146 to the tang slot 132. Then, the tag head 44 is moved rearwardly to cause the holding tang to enter the tang slot 132 and engage the inclined slot surface 136 which causes lateral downward displacement of the tag head lug portion 44b into the blade mounting slot 226 until the flat bottom surfaces of head portion 44a between head side flange surfaces 126, 127 engage the upper blade surfaces 248, 250 adjacent the mounting slot 226. The tag head is moved rearwardly until the facing surfaces 152, 154 on lower head portion 44b engages the rear end blade slot surface 234 and tang front end surface engages head slot front surface 138. Spaced head surfaces 117, 118 abut inclined blade surfaces 239, 240 whereby in the mounted position, the tag head 44 is located in an upwardly rearwardly inclined position with the pointed head tip portion 120 located within blade slot 226 below the plane of the upper blade surface 242. The flexible resilient strap portion 42 is upwardly rearwardly curved toward the identification portion 40 which is supported on applicator tool barrel in generally parallel relationship to the blade. The cutting blade and the tag head portion are driven through the animal ear and through the retaining member until the head abutment means 74, 75 pass beyond the retaining member abutment means 76, 77. Then, any relative longitudinal movement between the tag head 44 and the blade 206 causes the blade tang portion 228 to be removed from the tang slot 132 and engagement of the front end curved lug surfaces 128, 129 with blade slot curved surfaces 236, 238 lifts the lug portion 44b out of the blade lug slot 226. When the blade is withdrawn from the connector member slot 72, the resilient rib portions 78, 79 move into gripping engagement with the head abutment means 74, 75 to prevent withdrawal of the tag head from the connector member. The strap portion is located in a generally horizontally extending position and the rectangular cross-sectional configuration resists turning in the rectangular shape ear slit so that the tag assembly remains in the initially installed position.

While illustrative and presently preferred embodiments of the inventive concepts have been disclosed herein, the inventive concepts may be otherwise variously embodied and it is intended that the appended claims be construed to include alternative embodiments except as limited by the prior art.

What is claimed is:

1. An animal ear tag assembly for mounting on the ear of a domestic animal to identify and distinguish the animal from other animals and the assembly comprising:
    a one-piece tag retaining member made of molded plastic material, with a generally transversely extending central slot means therein, adapted to be located on one side of the animal ear in a substantially vertical attitude opposite a generally horizontally extending slit in the animal ear;
    an one-piece identification member made of flexible plastic material and comprising:
        an enlarged identification portion adapted to be located on the other side of the animal ear, in generally vertically extending parallel relationship thereto;
        an elongated strap portion connected to a central core portion of said identification portion and having a longitudinal axis extending transversely away from said identification portion and having a non-circular cross-sectional configuration and size and shape adapted to enable resilient flexible displacement relative to the identification portion and to extend through the generally horizontally extending slit in the animal ear and the generally horizontally extending central slot means in said one-piece tag retaining member;
        an enlarged head portion connected to said strap portion and having a larger cross-sectional size and shape than said strap portion and adapted to be inserted through said slit and said central slot means and located in abutting engagement with a generally vertically extending portion of said one-piece tag retaining member;
        said identification portion being separated into a plurality of separately flexible movable segmental portions by a plurality of slot means which are located radially outwardly of said central core portion and extend generally radially outwardly relative to said central longitudinal axis of said strap portion from said central core portion to the outer periphery of said identification portion and are located in circumferentially spaced relationship to one another;
    said identification member having a central core portion located between said segmental portions and said strap portion;
    each of said segmental portions comprising:
        a curved radially outermost edge portion, a pair of circumferentially spaced radially extending straight edge portions, and a straight radially innermost edge portion extending between said radially extending edge portions; said central core portion comprising:
        a plurality of straight outer peripheral edge portions which are inclined relative to one another and connected to one another by intermediate connecting portions;
        said radially extending slot means being radially aligned with said intermediate connection portions;
        said central core portion having a polygonal peripheral configuration providing a plurality of straight side edge portions equal in number to the number of segmental portions and located opposite and in spaced parallel relationship to said straight inner side edge portions of said segmental portions; and
        hinge groove means for each of said segmental portions being located between and defined in part by said outer side edge portions of said central core portion and said inner side edge portions of said segmental portions.

2. The invention as defined in claim 1 and wherein said identification portion having at least four segmental portions.

3. The invention as defined in claim 2 and wherein: one of said segmental portions is of larger size and shape relative to the other segmental portions.

4. The invention as defined in claim 1 and wherein: said radial slot means extending into and intersecting said hinge groove means.

5. The invention as defined in claim 4 and wherein: said hinge groove means having a depth equal to approximately one-half the thickness of said identification portion.

6. The invention as defined in claim 5 and wherein: said segmental portions of said identification portion having approximately the same thickness and the same shape and the same size.

7. The invention as defined in claim 3 and wherein: said retaining member comprising:
    a base portion having a thickness such as to be relatively inflexible; and
    a pair of relatively thin flexible flange portions located on opposite sides of said central slot means for flexible outward movement to enable passage of said head portion therethrough in one direction and flexible inward movement after passage of said head portion therethrough to thereafter prevent passage therethrough in the opposite direction.

8. The invention as defined in claim 7 and further comprising:
blade attachment slot means in said head portion for releasable attachment to a portion of a cutting blade during forward movement of the cutting blade while mounting of the ear tag assembly on an animal ear and for enabling said head portion to be passed through a slit in the animal ear and through said central slot means in said retaining member with the cutting blade and for enabling the cutting blade to be detached from said head portion during rearward movement of the cutting blade; and
said blade attachment slot means comprising a generally rectangular-shape slot having a rear wall portion in said head portion and a front wall portion in said head portion and rearwardly facing upper and lower abutment openings in said head portion and said strap portion.

9. The invention as defined in claim 8 and wherein said blade attachment slot means in said head portion further comprising a lower rearwardly extending bottom wall portion extending rearWardly from said front wall portion and being located forwardly of said abutment means and said strap portion.

10. The invention as defined in claim 9 and wherein:
said head portion having a relatively large upper portion and a relatively small lower lug portion and a pair of tapered edge portions terminating in a tip portion and flat opposite tapered side portions with a maximum width approximately equal to the width of said strap portion and a thickness greater than the thickness of said strap portion to provide a pair of transverse shoulder means between said head portion and said strap portion for engaging said flexible flange portions of said retaining member.

11. The invention as defined in claim 10 and wherein said tip portion further comprises:
upper and lower pairs of inwardly forwardly curved surfaces which intersect one another to form a forwardmost pointed tip.

12. The invention as defined in claim 11 and wherein said transverse shoulder means extend to the side edge surfaces of said strap portion and are rearwardly outwardly inclined relative to said strap portion.

13. The invention as defined in claim 1 and wherein:
said strap portion having a generally rectangular cross-sectional configuration defined by a pair of flat parallel opposite side surfaces and a pair of flat parallel opposite edge surfaces;
said head portion having a pair of flat parallel opposite side surfaces laterally outwardly offset relative to said flat parallel opposite side surfaces of said strap portion and being connected thereto by laterally extending rearwardly facing abutment surfaces engageable with said flexible flange portions on said retaining member.

14. The invention as defined in claim 13 and wherein said head portion further comprising:
a pair of flat parallel opposite side edge surfaces adjacent said abutment surfaces which are coplanar with said flat parallel opposite edge surfaces of said strap portion; and
said flat parallel opposite side surfaces of said head portion being forwardly inclined and terminating in a tip portion formed by inwardly curved intersecting surfaces.

15. The invention as defined in claim 14 and wherein:
said head portion having a lower lug portion for mounting in a mounting slot in an attachment blade and being constructed and arranged to locate said tip portion within the mounting slot.

16. The invention as defined in claim 1 and further comprising:
an elongated slot means in said strap portion for receiving an electronic signal sending means.

17. The invention as defined in claim 16 and wherein:
said slot means being cylindrical and having an entry opening in said identification portion.

18. The invention as defined in claim 17 and wherein:
said slot means being defined by a cylindrical portion of said strap portion having a diameter greater than the thickness of said strap portion.

19. An animal ear tag assembly for mounting on the ear of a domestic animal to identify and distinguish the animal from other animals of the same species and the assembly comprising:
a one-piece tag retaining member made of molded plastic material, with a generally transversely extending central slot means therein, adapted to be located on one side of the animal ear in a substantially vertical attitude opposite a generally horizontally extending slit in the animal ear;
a one-piece identification member made of flexible plastic material and comprising:
an enlarged identification portion adapted to be located on the other side of the animal ear, in generally vertically extending parallel relationship thereto;
a strap portion connected to said identification portion and extending transversely away from said identification portion and having a cross-sectional configuration and size and shape adapted to extend through the generally horizontally extending slit in the animal ear and the generally horizontally extending central slot means in said one-piece tag retaining member;
an enlarged head portion connected to said strap portion and having a larger cross-sectional size and shape than said strap portion and adapted to be inserted through said slit and said central slot means and located in abutting engagement with a generally vertically extending portion of said one-piece tag retaining member;
a plurality of radially extending circumferentially spaced slot means located in said identification portion of said identification member and defining a plurality of circumferentially spaced segment portions;
said identification member having a central core portion located between said segmental portions and said strap portion; each of said segmental portions comprising:
a radially outermost edge portion, a pair of circumferentially spaced radially extending straight edge portions, and a straight radially innermost edge portion extending between said radially extending edge portions;
said central core portion comprising:
a plurality of straight outer peripheral edge portions which are inclined relative to one another and connected to one another by intermediate connecting portions;

said radially extending slot means being radially aligned with said intermediate connecting portions;

said central core portion having a polygonal peripheral configuration providing a plurality of straight side edge portions equal in number to the number of segmental portions and located opposite and in spaced parallel relationship to said straight inner side edge portions of said segmental portions; and hinge groove means for each of said segmental portions being located between and defined in part by said outer side edge portions of said central core portion and said inner side edge portions of said segmental portions.

20. The invention as defined in claim 19 and wherein: said radial slot means extending into and intersecting said hinge groove means.

21. The invention as defined in claim 20 and wherein: said hinge groove means having a depth equal to approximately one-half the thickness of said identification portion.

22. The invention as defined in claim 21 and wherein: said segmental portions of said identification portion having approximately the same thickness and the same shape and the same size.

* * * * *

UNITED STATES PATENT AND TRADEMARK OFFICE
CERTIFICATE OF CORRECTION

PATENT NO. : 5,024,013
DATED : June 18, 1991
INVENTOR(S) : Norman J. Hayes and Raymond B. Avedon It is certified that error appears in the above-identified patent and that said Letters Patent is hereby corrected as shown below:

Column 2, line 32, before "DETAILED DESCRIPTION: insert
--Fig. 12 is a top view of the
applicator blade.--

Signed and Sealed this

Ninth Day of June, 1992

Attest:

DOUGLAS B. COMER

Attesting Officer

Acting Commissioner of Patents and Trademarks